Aug. 3, 1965  E. W. NYBERG ETAL  3,198,164
LAYOUT MACHINE
Original Filed Jan. 2, 1959
3 Sheets-Sheet 1
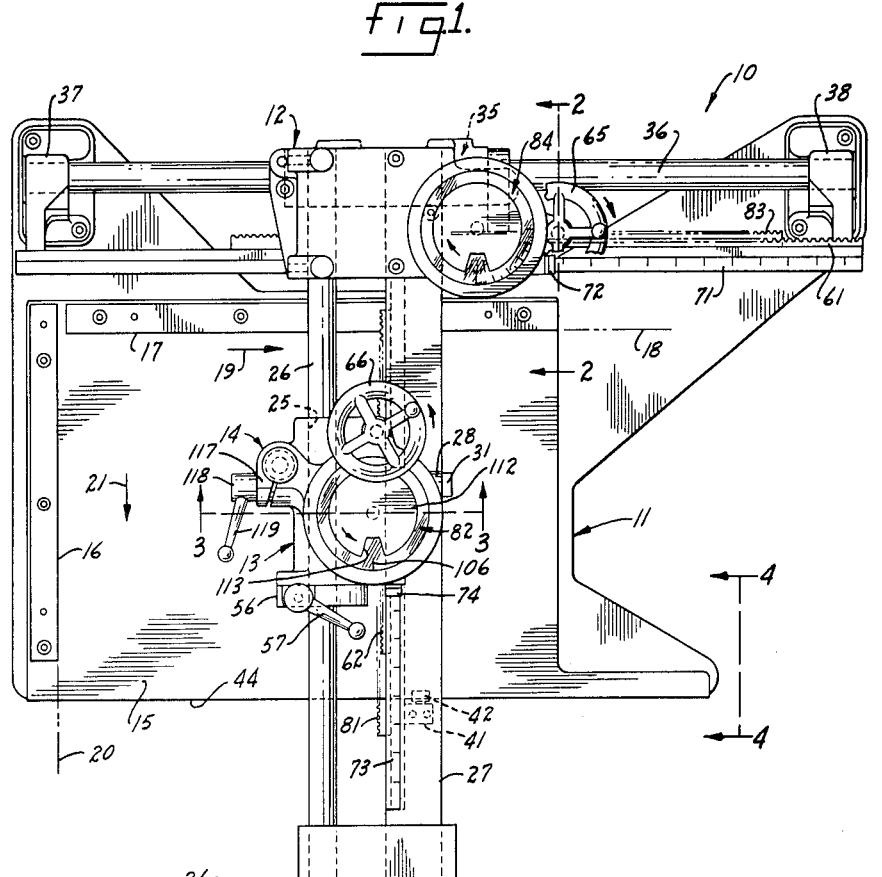
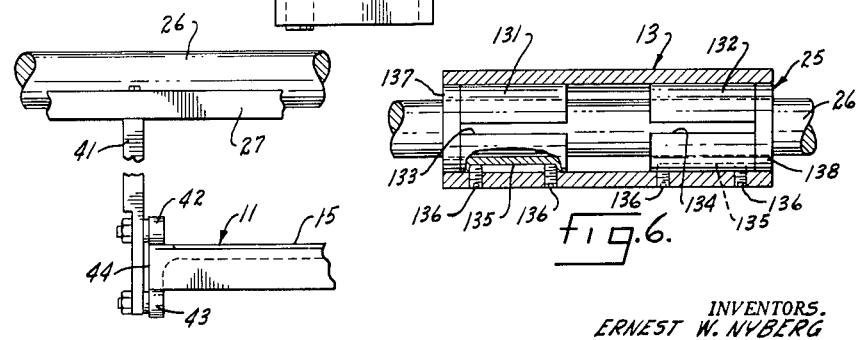
INVENTORS.
ERNEST W. NYBERG
ARTHUR W. VIRTA
BY
Wolf, Hubbard, Voit & Osann
Attorneys.

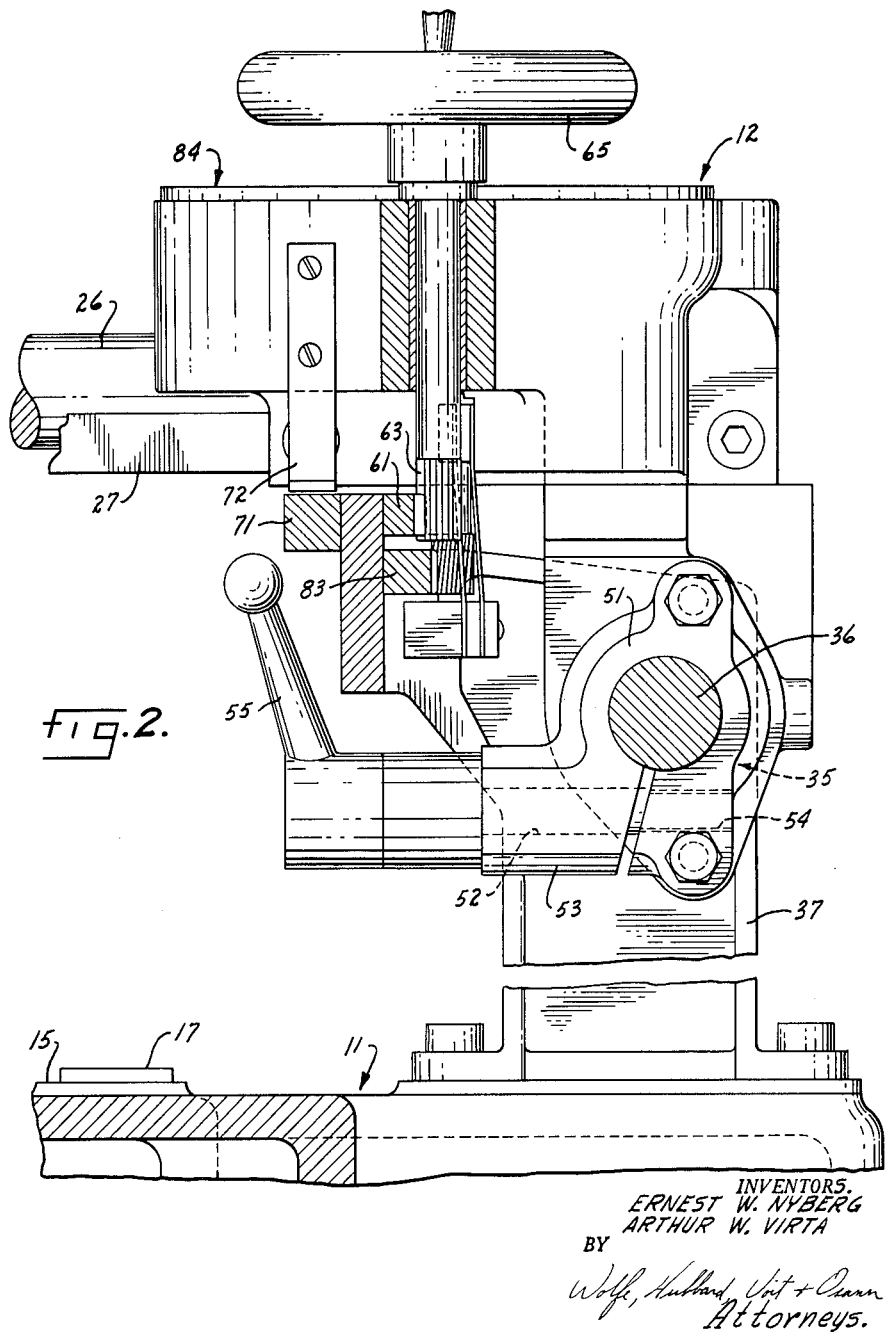

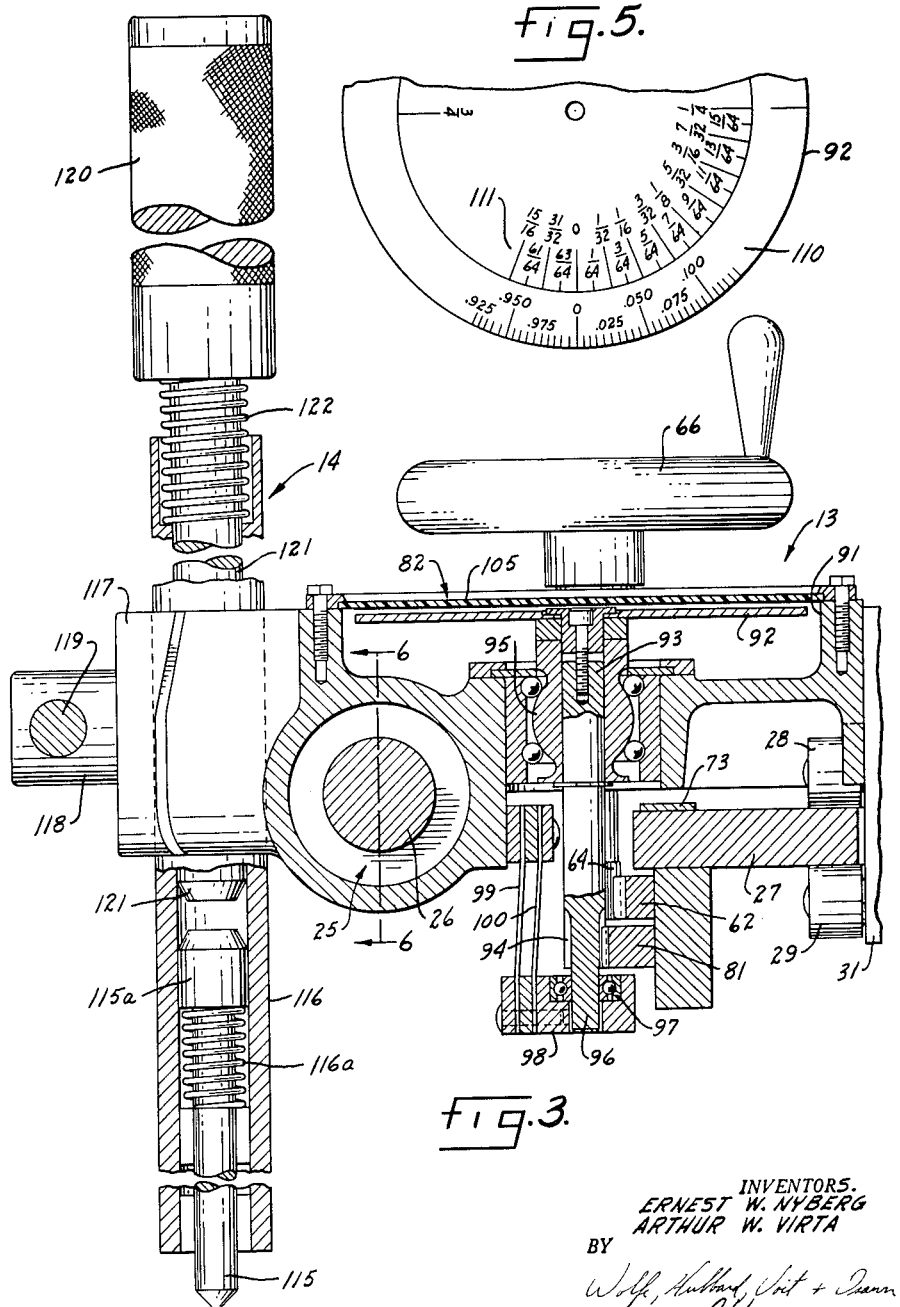

United States Patent Office 3,198,164
Patented Aug. 3, 1965

3,198,164
LAYOUT MACHINE
Ernest W. Nyberg, Chicago, and Arthur W. Virta, Mount Prospect, Ill., assignors to Ancraft Products Co., Chicago, Ill., a corporation of Illinois
Original application Jan. 2, 1959, Ser. No. 784,612, now Patent No. 3,116,556, dated Jan. 7, 1964. Divided and this application Feb. 25, 1963, Ser. No. 267,374
1 Claim. (Cl. 116—115)

This application is a division of our copending application Serial No. 784,612, filed January 2, 1959, and now Patent No. 3,116,556, issued January 7, 1964.

The present invention relates generally to marking and measuring devies for metal working and the like, and concerns more partcularly a layout machine for locating points and scribing lines or areas on small workpieces.

It is the primary aim of the invention to provide a novel layout machine that is highly accurate and easy to use so as to substantially reduce the time and cost normally required to "lay out" metal working or similar operations. It is a collateral object to provide a layout machine as characterized above that is inexpensive to manufacture and that can be reliably used to avoid tying up expensive and high-operating-cost units such as jig boring or milling machines.

Another object of the invention is to provide a layout machine as referred to above that is light and relatively simple in construction, but strong and rugged so as to withstand heavy-duty use without losing its accuracy and thus its effectiveness.

It is a further object to provide a machine of the above type having handwheel operated devices for accurately adjusting a marking assembly but which permits the assembly to be quickly and smoothly moved to a desired area by direct manual force.

In more detail it is an object to provide a layout machine with a novel position measuring arrangement which is exceptionally accurate as well as being rugged and economical to construct. A further detailed object is to provide a novel measuring dial design which facilitates accurate settings of a layout machine of the character referred to above.

Other objects and advantages of the invention will become apparent upon reading the following detailed description and upon reference to the drawings in which:

FIG. 1 is a plan view of a layout machine embodying the present invention.

FIG. 2 is an enlarged fragmentary section taken approximately along the line 2—2 of FIG. 1.

FIG. 3 is an enlarged fragmentary section taken approximately along the line 3—3 in FIG. 1;

FIG. 4 is a fragmentary elevation taken along the line 4—4 of FIG. 1;

FIG. 5 is a fragmentary enlarged view showing approximately one half of the dial plate utilized in the machine of FIG. 1; and FIG. 6 is a fragmentary section taken along line 6—6 in FIG. 3.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning first to FIG. 1, there is shown a layout machine 10 constructed in accordance with the present invention and including a base frame 11, a traveling column assembly 12 mounted on the frame, and a carriage 13 mounted on the column assembly. The carriage 13 carries the marking device assembly 14 to which further detailed reference will be made.

The frame 11 defines a work-supporting surface 15 and has mounted thereon a pair of abutments 16 and 17 which establish zero positions on first and second axes lying at right angles in the plane of the surface 15. The abutment 16 establishes a zero position for an axis 18 which extends along the front face of the abutment 17 in the direction indicated by the arrow 19. The abutment 17 establishes a zero position for an axis 20 which extends along the front face of the abutment 16 in the direction indicated by the arrow 21.

In the machine 10 embodying the invention, the column assembly 12 is mounted for smooth, accurately measured movement parallel to the axis 18, and the carriage 13 is mounted for smooth, accurately measured movement parallel to the axis 20, so that the assembly 14 can mark workpieces positioned against the abutments 16, 17 quickly, easily, and accurately. In the preferred embodiment, the carriage 13 includes a ball bushing assembly 25 (see FIG. 3) which snugly embraces a rod 26 that is a rigid part of the column assembly 12. The column assembly also includes a support bar 27 which parallels the rod 26, and the carriage is steadied on the rod 26 by a pair of rollers 28, 29 journaled on a bracket 31 fixed to the carriage and which engage the top and bottom, respectively, of the bar. It can thus be seen that the carriage may be smoothly reciprocated on the rod 26 through the interposed ball bushing assembly 25, and is steadied in its movement by the rollers 28, 29 which straddle the support bar 27.

The column assembly 12 also preferably includes a ball bushing assembly 35 that snugly embraces a rod 36 which is supported at each end by upright pedestals 37 and 38 fixed on the base frame 11. To steady the movement of the column assembly 12 along the rod 36, the outer end of the support bar 27 is provided with a depending arm 41 which journals a pair of rollers 42, 43 that straddle the forward edge 44 of the base frame 11 (see FIG. 4). The carriage assembly may thus be smoothly reciprocated on the rod 36 through the ball bushing assembly 35, and is steadied by the engagement of the rollers 42, 43 with the base frame 11.

In the illustrated embodiment, the ball bushing assemblies 25 and 35 each include a pair of split ball bushings of the commercially available type mounted so that they may be urged into snug engagement with the respective rods 26, 36. Considering the assembly 25 as exemplary, and with particular reference to FIG. 6, the rod 26 is surrounded by two spaced ball bushings 131, 132 split as 133 and 134, respectively. Each of the split bushings 131, 132 is provided with a groove 135 formed in its outer periphery and a pair of set screws 136 threaded into the carriage 13 engage the ends of each groove 135.

It will be appreciated that by driving the set screws inwardly, the split bushings will be drawn snugly about the rod 26 so that all looseness or "play" is taken out of the slidable connection between the rod and the carriage. Furthermore, the engagement of each pair of set screws 136 with the ends of the respective grooves rigidly locks the bushings 131, 132 with respect to the carriage.

To seal the bushing assembly, a pair of end disks 137 and 138 are fitted about the rod 26 and are secured to the carriage at each end of the assembly 25.

Although only the bushing assembly 25 has been described in detail, it will be understood that the assembly 35 is similarly constructed and arranged.

In order to independently lock the sliding movements of the column assembly 12 and the carriage 13, these members are provided with clamps in the form of split collars which may be tightened about the rods 36 and 26 respectively. Thus, the column assembly 12 includes a split collar 51 (see FIG. 2) that is bolted to the assembly so as to surround the rod 36. A bolt member 52 passes through the unrestrained end 53 of the collar 51 and is threaded at 54 in the opposite end of the collar. A handle 55 is secured to the bolt member and it will be apparent that, upon rotation of the handle, the clamp 51 is either loosened or drawn tightly about the rod 36 to lock the column assembly 12 against sliding movement. The carriage 13 is provided with a similar collar 56 having a tightening handle 57 that is effective to tightly clamp the carriage against movement on the rod 26.

The mounting of the column assembly 12 and the carriage 13 by means of ball bushings which snugly engage rigid rods imparts to the layout machine 10 several distinct and important advantages. For example, the column assembly 12 and the carriage 13 move smoothly parallel to the axes 18, 20, respectively, upon the application of very little force, and this facilitates the accurate positioning of these parts. Furthermore, this mounting arrangement allows the column assembly and carriage to be manually pushed toward a desired position as the resistance to movement is so low. It will be apparent that this mode of operation materially increases the speed with which the machine can be used. Still further, because of the snug engagement of the ball bushings with the rods, true linear movement of the column assembly 12 along the axis 18, and of the carriage 13 along the axis 20, is achieved without any looseness or skewing of these parts.

Turning next to the manner in which the column assembly and the carriage are adjustably positioned along their respective paths of travel, a gear rack 61 is fixed to the base frame 11 (see FIGS. 1 and 2) and a gear rack 62 is fixed to the column assembly 12 on the underside of the support bar 27 (see FIGS. 1 and 3). The column assembly carries a journaled pinion 63 which is in meshing engagement with the rack 61, and the carriage carries a journaled pinion 64 which is in meshing engagement with the rack 62. The pinions 63, 64 are directly driven by respective handwheels 65, 66, so that rotation of the handwheels in the direction of the arrows adjacent thereto in FIG. 1 moves the column assembly 12 and the carriage 13 in the directions of the arrows 19, 21, respectively.

To indicate the approximate position of the column assembly 12 from the axis 20 and the position of the carriage 13 from the axis 18, a scale 71 is mounted on the base frame 11 to cooperate with a pointer element 72 on the column assembly 12 (see FIGS. 1 and 2) and a scale 73 is mounted on the upper side of the support bar 27 to cooperate with a pointer element 74 carried by the carriage 13 (see FIGS. 1 and 3). Preferably, these scales 71, 73 are divided into one-inch increments so that the positions of the column assembly 12 and the carriage 13 from their respective zero marks is indicated by these scales to the nearest inch.

It is one of the important features of the invention that for precisely measuring the positions of the column assembly and the carriage, a set of precision gear racks are provided parallel to the axes 18, 20, and dial indicators are mounted on the column assembly and the carriage which are coupled to the precision racks through uniformly loaded, floating gears. In the illustrated embodiment, a precision gear rack 81 is fixed to the column assembly 12 beneath the support bar 27 and a dial indicator 82 is carried by the carriage 13 to cooperate with the rack 81 (see FIGS. 1 and 3). For convenience, only the arrangement of the rack 81 and the indicator 82 will be described in detail although it will be understood that a similar precision rack 83 and a similar dial indicator 84 are mounted, respectively, on the base frame 11 and the column assembly 12 (see FIGS. 1 and 2).

Turning with more particularity to the rack 81 and the indicator 82, and with special reference to FIG. 3, it will be seen that the indicator 82 includes a cylindrical chamber 91 within which is carried a circular dial 92. The dial is rigidly secured to a shaft 93 having a pinion portion 94 at its lower end which is in meshing engagement with the rack 81. The shaft 93 is supported by a self-alining bearing 95 at its upper end, and its lower end 96 is mounted in a bearing 97 carried by a support block 98 that is secured to the carriage 13 by means of a pair of flat springs 99, 100. The springs 99, 100 are arranged to urge the support block 98 toward the right in FIG. 3 so as to resiliently carry the pinion portion 94 into meshing engagement with the precision gear rack 81 with a uniform force on load.

Enclosing the indicator chamber 91 and covering the circular dial 92 is a rotatably supported cover glass 105 which carries a radial zero reference mark 106 (see FIG. 1). It will thus be appreciated that sliding movement of the carriage 13 causes the shaft 93 to rotate on the rack 81 so as to swing the dial 92 beneath the cover glass 105 and its reference mark 106. In the illustrated machine, the gear rack 81 and the pinion portion 94 are calibrated so that exactly one revolution of the dial 92 corresponds to precisely one inch of carriage movement. Since the cover glass 105 is rotatable, the zero reference mark 106 can be easily positioned to overlie a zero mark on the face of the dial 92 when the carriage is placed in its starting position. Thereafter, the dial 92 indicates, in cooperation with the reference mark 106, the fractional part of each inch over which the carriage travels. Since the dial bearing the indicia rotates rather than the reference mark 106 as in a conventional indicator, the indicator 82 is always easily read from the same operating position.

The uniformly loaded, floating gear couplings between the precision gear racks 81, 83 and the respective dial indicators 82, 84 is particularly advantageous since it produces uniformly accurate readings for the positions of the column assembly and the carriage. This accuracy results from the lack of backlash between the floating dial-shaft pinions and the respective racks with which they are engaged, and the fact that the pinions are urged with a uniform pressure into engagement with the racks so that these parts are always maintained in proper meshing relationship on accurately predetermined pitch lines. It will also be observed that since the column assembly 12 and the carriage 13 cooperate with pairs of racks 61, 83, and 62, 81 respectively, and since the precision racks 81, 83 are used only for measuring purposes, there is little wear or strain on these measuring parts so that their accuracy is not affected throughout the long, heavy-duty, service life of the layout machine 10.

As a further feature of the invention embodied in the layout machine, the dials of the indicators 82, 84 are particularly arranged for quick, easy and accurate reading. The illustrative dial 92 (see FIG. 5) is thus provided with outer and inner circumferential bands of indicia 110, 111. The outer band 110 is evenly marked in units representing 0.005 of an inch, whereas the inner band 111 is subdivided into units representing 1/64 of an inch. This arrangement facilitates reading the dial indicators in both fractional and decimal points of an inch.

Preferably, the center portion 112 of the cover glass 105 is rendered opaque and is formed with a reading notch 113 (see FIG. 1) which lies over the inner band of indicia 111. This blocks from the operator's vision all of the indicia band 111 except those few numbers positioned opposite the reference mark 106, and thus relieves the operator from the confused pattern of many closely spaced fractions written in staggered, circular rows.

Turning now with more particularity to the marking assembly 14, and with reference to FIG. 3, in the proposed embodiment the marking member is a center punch 115 carried by a sleeve 116 within a split collar 117 formed as part of the carriage 13. The punch 115 is slidably carried within the sleeve 116 and is formed with an anvil portion 115a which rests on a compression spring 116a. A bolt member 118, provided with a handle 119, is arranged to clamp the collar 117 tightly about the sleeve 116 so as to suspend the center punch 115 above the work-supporting surface 15. By loosening the collar 117, the center punch 115 can be lowered into engagement with the work being marked.

The illustrated marking assembly 14 includes a handle 120 secured for limited lost-motion movement on the sleeve 116. The handle 120 has a shaft 121 which is slidably fitted within the sleeve and whose lower end overlies the punch anvil portion 115a. A spring 122 holds the handle in its rest position out of contact with the punch.

To centerpunch a piece of work, the handle 120 is driven downwardly so that the shaft 121 strikes the anvil portion 115a and carries the punch into contact with the work. To scribe lines or areas with the layout machine 10, it will be understood that the center punch 115 is brought into contact with the work and the handwheels 65, 66 manipulated to draw the center punch over the work under the control of the operator. Those skilled in the art will of course observe that many marking and layout functions can be performed by the machine 10 since the marking center punch 115 can be quickly, easily and accurately positioned with respect to the fixed abutments 16, 17.

We claim as our invention:

In a layout machine having relatively movable members, a position indicating dial assembly comprising, in combination, a frame defining a cylindrical chamber, a circular dial journaled in said chamber, means coupling said dial to said members to rotate the dial relative to said frame upon said relative movement said dial having outer and inner peripheral bands of indicia, said outer band of indicia dividing said circular dial into decimal parts of the dial circumference, said inner band of indicia dividing said circular dial into fractional parts of the dial circumference, a glass cover rotatably mounted in said frame over said dial, said cover having a radially extending reference mark, and means for clamping said cover in place so as to fix said reference mark with respect to said dial.

References Cited by the Examiner

UNITED STATES PATENTS

| | | | |
|---|---|---|---|
| 1,485,600 | 3/24 | De Bus | 33—172 |
| 1,615,668 | 6/27 | Anderson | 33—189 |
| 2,481,078 | 9/49 | Burdwood | 33—164 |
| 2,514,025 | 7/50 | Bush | 116—125 |
| 2,623,337 | 12/52 | Falls | 33—174 |
| 2,989,811 | 6/61 | McMahon | 35—31.1 |
| 3,024,540 | 3/62 | Orth | 35—31.1 |

LOUIS J. CAPOZI, *Primary Examiner.*